United States Patent
Gurbanov et al.

(10) Patent No.: US 11,647,240 B2
(45) Date of Patent: May 9, 2023

(54) APPARATUS FOR OUTPUTTING CONTENT

(71) Applicant: Raters Group Ltd., Tonbridge (GB)

(72) Inventors: Tural Gurbanov, Tonbridge (GB); Rasim Aliyev, London (GB); Jamil Abdullayev, London (GB)

(73) Assignee: Raters Group Ltd., Tonbridge (GB)

( * ) Notice: Subject to any disclaimer, the term of this patent is extended or adjusted under 35 U.S.C. 154(b) by 0 days.

(21) Appl. No.: 17/378,816

(22) Filed: Jul. 19, 2021

(65) Prior Publication Data

US 2023/0036330 A1 Feb. 2, 2023

(51) Int. Cl.
*H04N 21/25* (2011.01)
*H04N 21/482* (2011.01)
*H04N 21/466* (2011.01)

(52) U.S. Cl.
CPC ....... *H04N 21/252* (2013.01); *H04N 21/4668* (2013.01); *H04N 21/4826* (2013.01)

(58) Field of Classification Search
CPC ............. H04N 21/252; H04N 21/4668; H04N 21/4826; H04N 21/4532; H04N 21/25891; H04N 21/251; H04N 21/466; H04N 21/4666; H04N 21/25883; H04N 21/4662
USPC .......................................................... 725/14
See application file for complete search history.

(56) References Cited

U.S. PATENT DOCUMENTS

| | | | |
|---|---|---|---|
| 6,112,186 A * | 8/2000 | Bergh | G06F 16/9535 705/14.66 |
| 8,478,747 B2 * | 7/2013 | Jeong | G06F 16/9537 707/723 |
| 10,397,659 B1 * | 8/2019 | Ling | H04N 21/4334 |
| 11,375,256 B1 * | 6/2022 | Dorner | G06N 20/00 |
| 11,451,598 B1 * | 9/2022 | Chawla | G06F 16/74 |
| 2013/0290110 A1 * | 10/2013 | LuVogt | G06Q 30/02 705/14.66 |
| 2014/0086554 A1 * | 3/2014 | Yehezkel | H04N 21/278 386/E9.011 |
| 2016/0274744 A1 * | 9/2016 | Neumann | H04N 21/47202 |
| 2020/0336802 A1 * | 10/2020 | Russell | G06V 10/82 |

FOREIGN PATENT DOCUMENTS

| | | | | |
|---|---|---|---|---|
| WO | WO-2012177413 A1 * | 12/2012 | | H04N 21/44222 |
| WO | WO-2020228514 A1 * | 11/2020 | | G06F 16/9535 |

* cited by examiner

Primary Examiner — Cynthia M Fogg

(57) ABSTRACT

There is described an apparatus for providing a recommendation to a first user, wherein the apparatus comprises: a processor arranged to: determine, at a first time, a first set of vectors for a plurality of users, including a vector associated with the first user; determine a set of clusters based on the first set of vectors; detect, at a second time, an event associated with the first user; determine an updated vector for the first user in dependence on the event; place the first user into a cluster of the set of clusters based on the updated vector; and determine a recommended item of content for the first user in dependence on the cluster; and a user interface and/or communication interface arranged to: output the recommendation and/or the recommended item to the first user.

20 Claims, 12 Drawing Sheets

APPARATUS FOR OUTPUTTING CONTENT

FIELD AND BACKGROUND OF THE INVENTION

The present invention relates to an apparatus, and system, for outputting recommendations as well as a method of outputting recommendations.

Media services, such as those that provide video streaming, are in widespread use. In order to increase user engagement, these media services tend to recommend media for users. These recommendations may be based on a user's viewing history, their age, or their location.

At the present time, methods of recommending media are imperfect so that recommended media is often of no interest to users. This has a negative effect on a user's experience and can result in users becoming disillusioned with media services.

SUMMARY OF THE INVENTION

Aspects and embodiments of the present invention are set out in the appended claims. These and other aspects and embodiments of the invention are also described herein.

According to an aspect of the present disclosure, there is described an apparatus for providing a recommendation to a first user, wherein the apparatus comprises: a processor arranged to: determine, at a first time, a first set of vectors for a plurality of users, including a vector associated with the first user; determine a set of clusters based on the first set of vectors; detect, at a second time, an event associated with the first user; determine an updated vector for the first user in dependence on the event; place the first user into a cluster of the set of clusters based on the updated vector; and determine a recommended item of content for the first user in dependence on the cluster; and a user interface and/or communication interface arranged to: output the recommendation and/or the recommended item to the first user.

Preferably, the processor is arranged to determine a cluster centroid vector for each of the clusters.

Preferably, placing the first user into a cluster comprises determining a closest cluster centroid vector to the updated vector.

Preferably, determining the recommended item comprises determining that a predicted response of the user to the item exceeds a threshold response.

Preferably, the predicted response is determined based on: the response of one or more other users to the item; and a similarity between the first user and each of the other users.

Preferably, the processor is arranged to determine one or more neighbours of the first user based on a similarity between the vectors of the first user and the vectors of the neighbours. Preferably, the recommended item depends on the neighbours.

Preferably, determining one or more neighbours comprises determining one or more users in the same cluster as the first user.

Preferably, determining one or more neighbours comprises determining one or more users in a different cluster to the first user.

Preferably, the processor is arranged to determine one or more anti-neighbours of the first user based on a difference between the vectors of the first user and the vectors of the neighbours. Preferably, the recommended item depends on the anti-neighbours.

Preferably, the processor is arranged to determine whether the event is a triggering event, and determining the updated vector in dependence on the event being a triggering event.

Preferably, determining the set of clusters comprises determining the set of clusters so that each cluster contains the same number of vectors.

Preferably, the processor is arranged to determine periodically an updated vector for the first user.

Preferably, the processor is arranged to determine periodically: a set of vectors for a plurality of users; and a set of clusters based on the first set of vectors. Preferably, the processor is arranged to determine the set of vectors and/or the set of clusters no more than once a day, once a week, and/or once a fortnight.

Preferably, the determining of the updated vector occurs more frequently than the determining of the set of clusters.

Preferably, the determining of the updated vector occurs based on an event.

Preferably, the determining of the set of clusters occurs regularly and/or at a fixed period.

Preferably, the processor is arranged to determine a plurality of users for which a threshold amount of data is available. Preferably, the clusters are determined based only on said plurality of users.

Preferably, the processor is arranged to assign a default vector to users for which the threshold amount of data is not available.

Preferably, each vector is formed of a combination of component vectors. Preferably, the component vectors are determined using different processes and/or algorithms.

Preferably, the processor is arranged to assign default component vectors to users for which a threshold amount of data associated with the corresponding component is not available.

Preferably, determining the set of clusters comprises determining the clusters using machine learning.

Preferably, the processor is arranged to determine a set of sub-clusters based on the first set of vectors.

Preferably, the method comprises periodically determining the set of sub-clusters.

Preferably, the determining of a set of sub-clusters occurs more regularly than the determining of a set of clusters.

Preferably, the determining of a set of vectors occurs more regularly than the determining of a set of sub-clusters.

Preferably, the processor is arranged to sample a plurality of relevant clusters based on a similarity between the further cluster and the plurality of sampled clusters. Preferably, the recommended item is determined in dependence on the plurality of relevant clusters.

Preferably, the processor is arranged to select one or more sampled user from each of the sampled clusters, wherein the recommended item is determined in dependence on the sampled users.

Preferably, the processor is arranged to sample one or more users.

Preferably, the selection of sampled users is dependent on a similarity between each sampled user and the first user.

Preferably, the selection of sampled users is based on a difference between the vectors of each sampled users and the vectors of the first user. Preferably, the selection of sampled users is based on a difference between components of said vectors.

Preferably, the selection of sampled users is based on a difference between one or more of the components of the vectors of the sampled users and one or more corresponding components of the vectors of the first user.

Preferably, the item comprises a media item, preferably a song, a film, and/or a television program.

Preferably, the apparatus comprises an apparatus for providing recommendations in association with a domain-oriented social network.

According to another aspect of the present disclosure, there is described a system for providing a recommendation to a first user, wherein the system comprises: means for determining, at a first time, a first set of vectors for a plurality of users, including a vector associated with the first user; means for determining a set of clusters based on the first set of vectors; means for detecting, at a second time, an event associated with the first user; means for determining an updated vector for the first user in dependence on the event; means for placing the first user into a cluster of the set of clusters based on the updated vector; and means for determining a recommended item of content for the first user based on the cluster; and means for outputting the recommendation and/or the recommended item to the first user.

Preferably, the system comprises a plurality of computer devices.

Various computer devices and/or components of computer devices may implement the features described above in relation to the processor of the aforesaid apparatus (e.g. each of the aforesaid features may be implemented by the processors of a plurality of computer devices instead of by a single processor).

According to another aspect of the present disclosure, there is described a method of providing a recommendation to a first user, the method comprising: determining, at a first time, a first set of vectors for a plurality of users, including a vector associated with the first user; determining a set of clusters based on the first set of vectors; detecting, at a second time, an event associated with the first user; determining an updated vector for the first user in dependence on the event; placing the first user into a cluster of the set of clusters based on the updated vector; determining a recommended item of content for the first user based on the cluster; and outputting the recommendation and/or the recommended item to the first user.

According to another aspect of the present disclosure, there is described a computer program product for performing the aforesaid method.

The invention extends to any novel aspects or features described and/or illustrated herein.

Further features of the disclosure are characterised by the other independent and dependent claims.

Any feature in one aspect of the disclosure may be applied to other aspects of the disclosure, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the disclosure can be implemented and/or supplied and/or used independently.

The disclosure also provides a computer program and a computer program product comprising software code adapted, when executed on a data processing apparatus, to perform any of the methods described herein, including any or all of their component steps.

The disclosure also provides a computer program and a computer program product comprising software code which, when executed on a data processing apparatus, comprises any of the apparatus features described herein.

The disclosure also provides a computer program and a computer program product having an operating system which supports a computer program for carrying out any of the methods described herein and/or for embodying any of the apparatus features described herein.

The disclosure also provides a computer readable medium having stored thereon the computer program as aforesaid.

The disclosure also provides a signal carrying the computer program as aforesaid, and a method of transmitting such a signal.

The disclosure extends to methods and/or apparatus substantially as herein described with reference to the accompanying drawings.

Embodiments of the disclosure are described below, by way of example only, with reference to the accompanying drawings.

DESCRIPTION OF SPECIFIC EMBODIMENTS OF THE INVENTION

Figure 1:
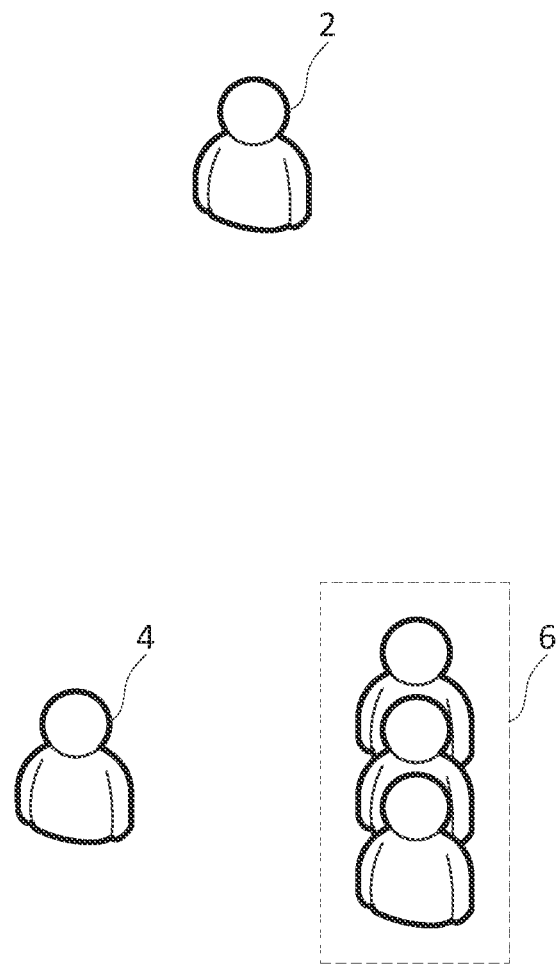
FIG. 1 shows a system comprising a plurality of users.

Referring to FIG. 1, there is shown a system comprising a first user 2, a second user 4, and a group of users 6. The system typically comprises a media service, such as a video streaming service or a music streaming service, where each of the users is a user of this system.

With such a system it is desirable to recommend media to the first user 2. For example, services often attempt to recommend films or artists that a user might like. These recommendations may be based on the second user 4 and/or the group of users 6. In a simple implementation, the first user is able to follow the second user and/or join the group of users, the first user is then recommended content based on the activity of the second user and/or the group of users. For example, if the second user registers a positive opinion of a film, this film may be recommended to the first user.

In order to implement the recommending of content, the present disclosure relates to the provision of a recommendation system, which recommendation system recommends content to the users of the system based on parameters. The recommendation system may take into account one or more of the following parameters:

User characteristics, e.g. age or gender.

User locations, e.g. the country and/or city in which a user lives.

User history/behaviour, e.g. the films that a user has watched in the past.

Device data, e.g. a type of device on which the user is consuming media.

A current user situation, e.g. whether the user is alone or is with somebody else, or whether the user has an upcoming commitment and thus a limited amount of time available.

Furthermore, as described above the recommendation system may take into account the behaviour of other users of the system (e.g. similar users). Methods of determining similar users, as well as methods of recommending content based on similarity are described below.

While the examples described herein typically relate to the recommending of media, it will be appreciated that the recommendation system disclosed herein is useable for recommending any type of content (e.g. recommending connections on social networking sites, recommending music and/or films, recommending food, and/or or recommending goods or services that a user may wish to use). The methods disclosed herein are of particular use in domain-oriented social networks (e.g. media services and professional connection services).

Figure 2:
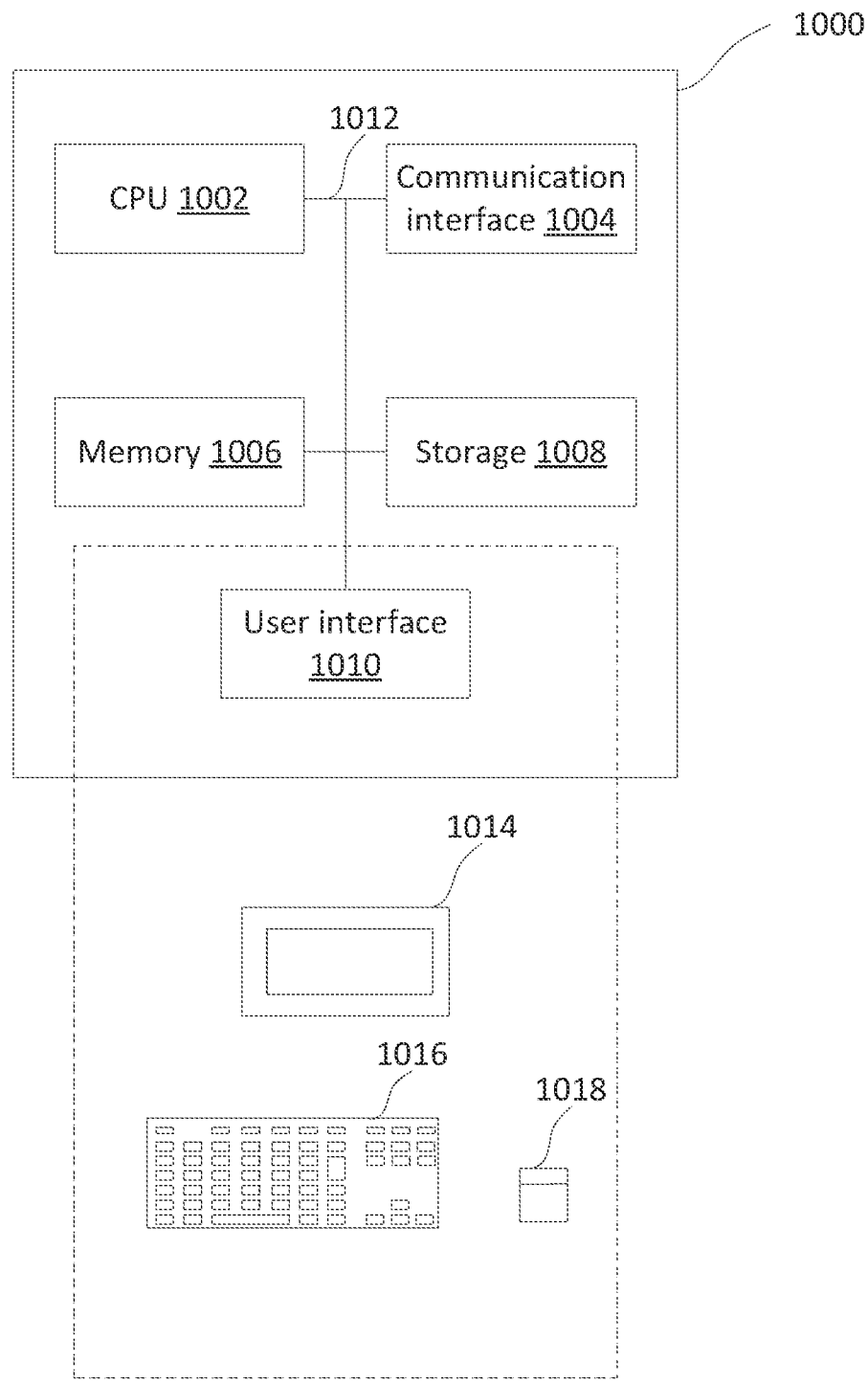
FIG. 2 illustrates a computer device on which aspects of the disclosure can be implemented.

Referring to FIG. 2, each user is typically implemented or realised on a computer device 1000. For example, where the recommendation system is used to recommend media, each user accesses a media service using a computer device and the recommendation system typically recommends media through the media service. A plurality of users may access such a service using a single, shared, device and/or a single user may access the media service from a plurality of different devices (e.g. a phone and a laptop).

Each computer device 1000 typically comprises a processor in the form of a CPU 1002, a communication interface 1004, a memory 1006, storage 1008, and a user interface 1010 coupled to one another by a bus 1014. The user interface comprises a display 1014 and an input/output device, which in this embodiment is a keyboard 1016 and a mouse 1018.

The CPU 1002 executes instructions, including instructions stored in the memory 1006 and/or the storage 1008.

The communication interface 1004 is typically an Ethernet network adaptor coupling the bus 1012 to an Ethernet socket. The Ethernet socket is coupled to a network, such as the Internet. The communication interface facilitates communication between the users of the network. It will be appreciated that any communication medium may be used by the communication interface, such as area networks (e.g. the Internet), infrared communication, and Bluetooth®.

The memory 1006 stores instructions and other information for use by the CPU 1002. The memory is the main memory of the computer device 1000. It usually comprises both Random Access Memory (RAM) and Read Only Memory (ROM).

The storage 1008 provides mass storage for the computer device 1000. In different implementations, the storage is an integral storage device in the form of a hard disk device, a flash memory or some other similar solid state memory device, or an array of such devices.

A computer program product is provided that includes instructions for carrying out aspects of the method(s) described below. The computer program product is stored, at different stages, in any one of the memory 1006, the storage 1008 and/or a removable storage (e.g. a universal serial bus storage device). The storage of the computer program product is non-transitory, except when instructions included in the computer program product are being executed by the CPU 1002, in which case the instructions are sometimes stored temporarily in the CPU or memory. It should also be noted that the removable storage is removable from the computer device 1000, such that the computer program product may be held separately from the computer device from time to time. Different computer program products, or different aspects of a single overall computer program product, are present on the computer devices used by any of the users.

The recommendation system described herein may be implemented on the computer device of any of the users and/or the recommendation system may be implemented on a plurality of computer devices, where each device implements an aspect of the recommendation system. Furthermore, the recommendation system may be implemented on a computer device that is not associated with any of the users, e.g. on a server, or a plurality of servers, that receives information from a plurality of users/user devices.

Figure 3A:
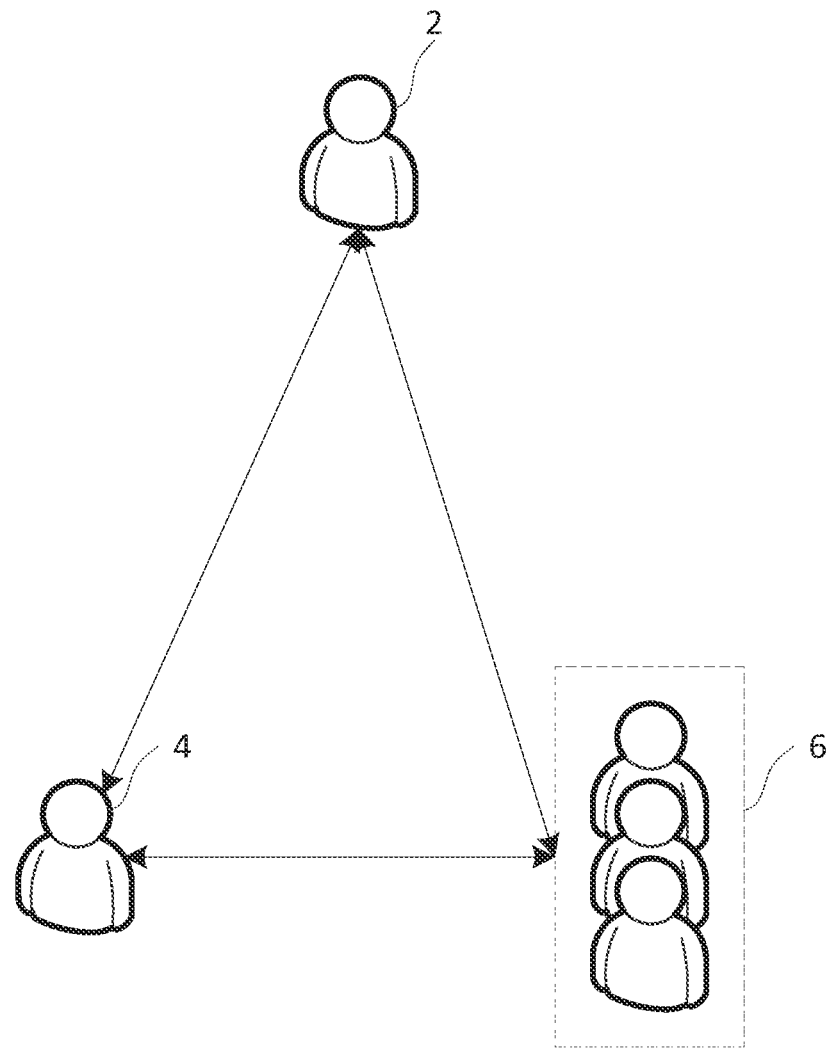
FIGS. 3a and 3b show exemplary interactions of the users in the system.

Referring to FIG. 3a, each of the users is typically implemented or realised using a computer device as described with reference to FIG. 2 so that the system of FIG. 1 comprises a system of computer devices. The computer devices and/or the users are then able to communicate via their respective communication interfaces. Therefore, media and/or recommendations can be shared between the first user 2, the second user 4, and the group of users 6.

Figure 3B:
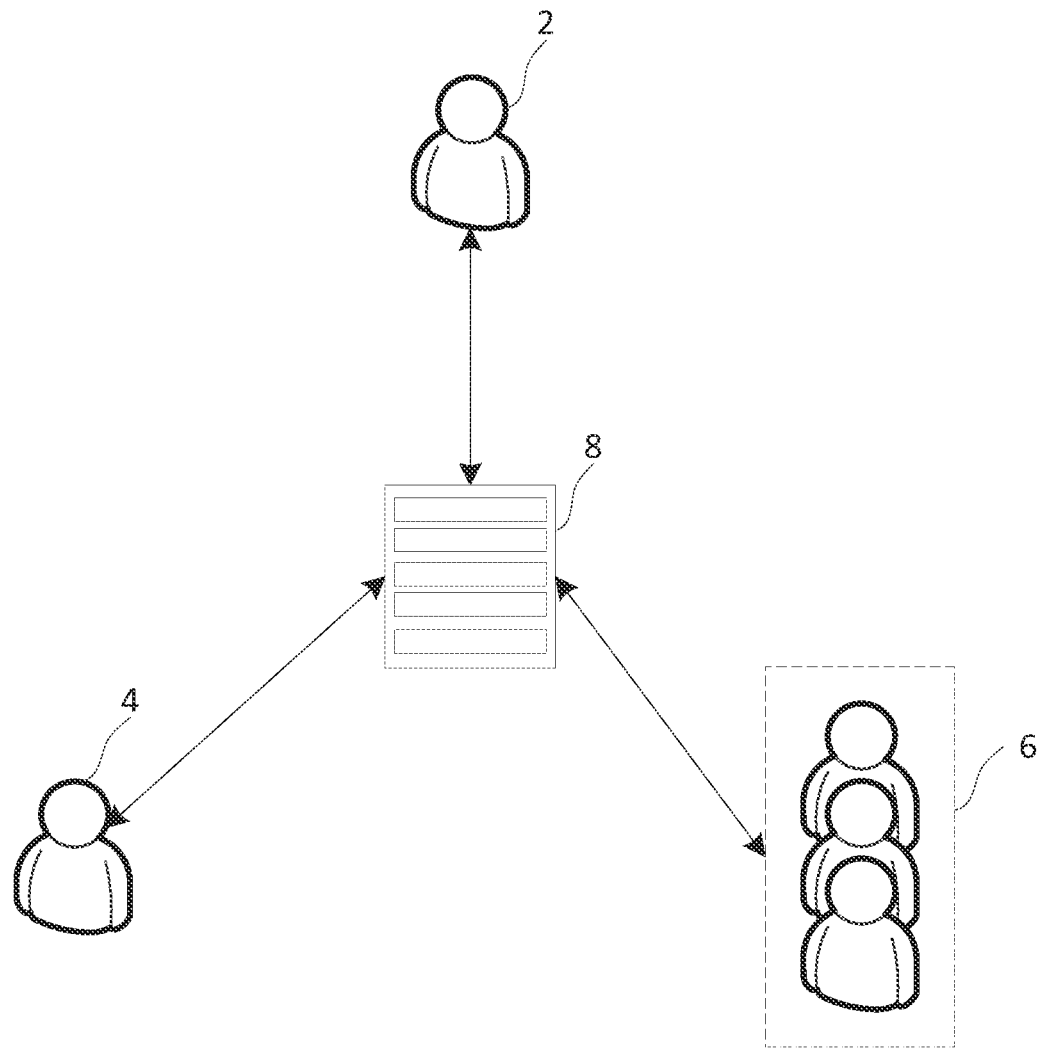

Referring to FIG. 3b, the users may alternatively (or in addition) communicate via a server 8. In particular, the recommendation system may be provided on a server that receives transmission from each of the users and then provides recommendations to the users based on these received transmissions. The requests (and the consumption) of each of the users may then be analysed in order to determine suitable recommendations for these users.

In practice, the server 8 is typically associated with a content delivery system, such as a media service. In this situation, the users request films from the media service, which films are stored on the server. The recommendation system may then be implemented using the server, where the users are recommended films via a user interface associated with the media service.

Equally, the recommendation system and the content delivery system may be implemented on different apparatuses.

The server 8 may be configured for this purpose. Therefore, the server may have a powerful CPU, a large amount of storage space, and/or a communication interface that can handle large numbers of simultaneous transmissions.

Disclosed herein is a recommendation system that is arranged to provide personalised suggestions for content that may be of interest to the users of the system. These personalised suggestions are determined based on feedback from these users, which feedback can be either explicit (e.g. the user may input an opinion on a film) or implicit (e.g. feedback may be received via clicks, purchases, or views of the user). Furthermore, the suggestions are determined based on the activities of other users of the system.

Figure 4A:
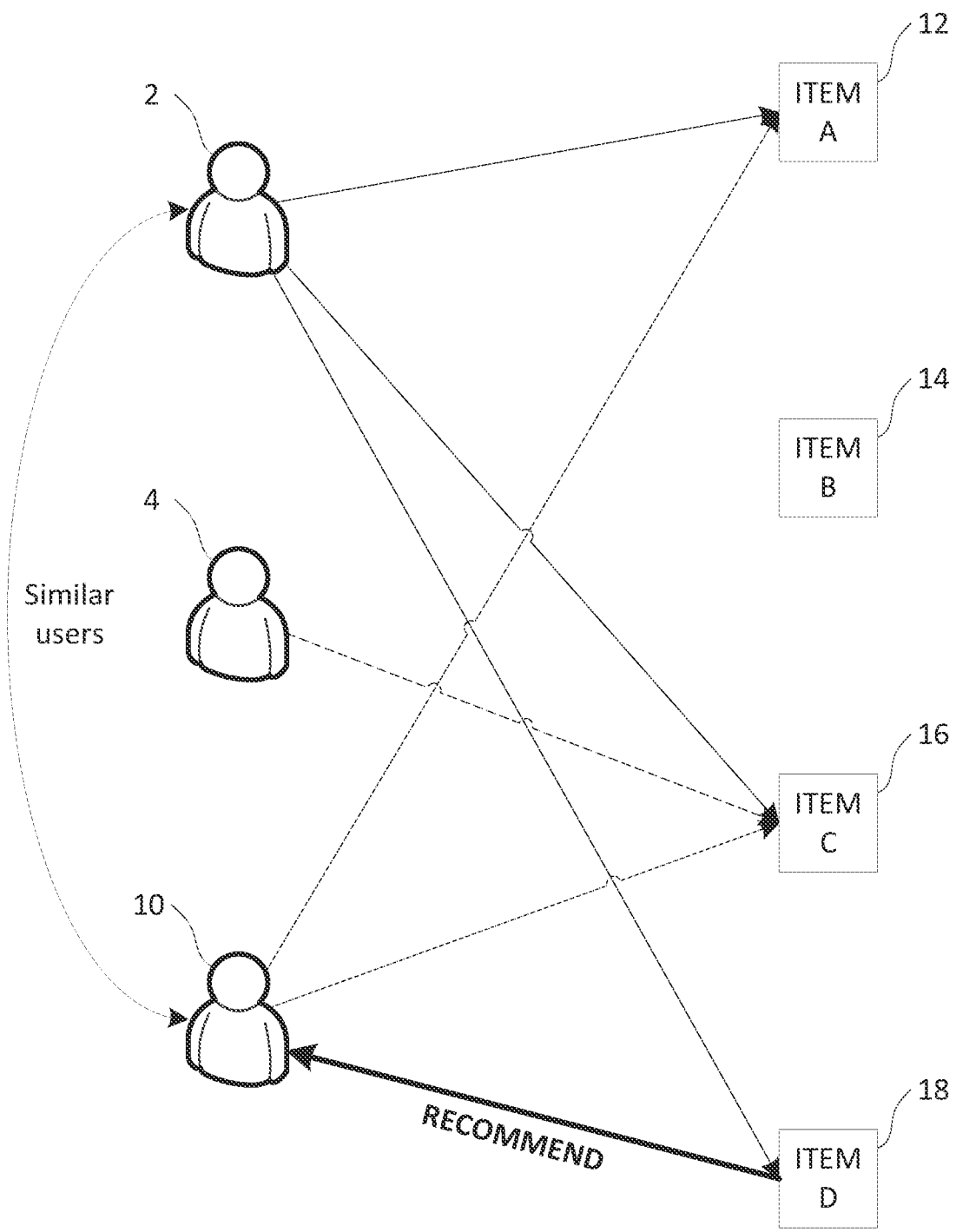
FIGS. 4a and 4b illustrate approaches for providing recommendations.
Figure 4B:
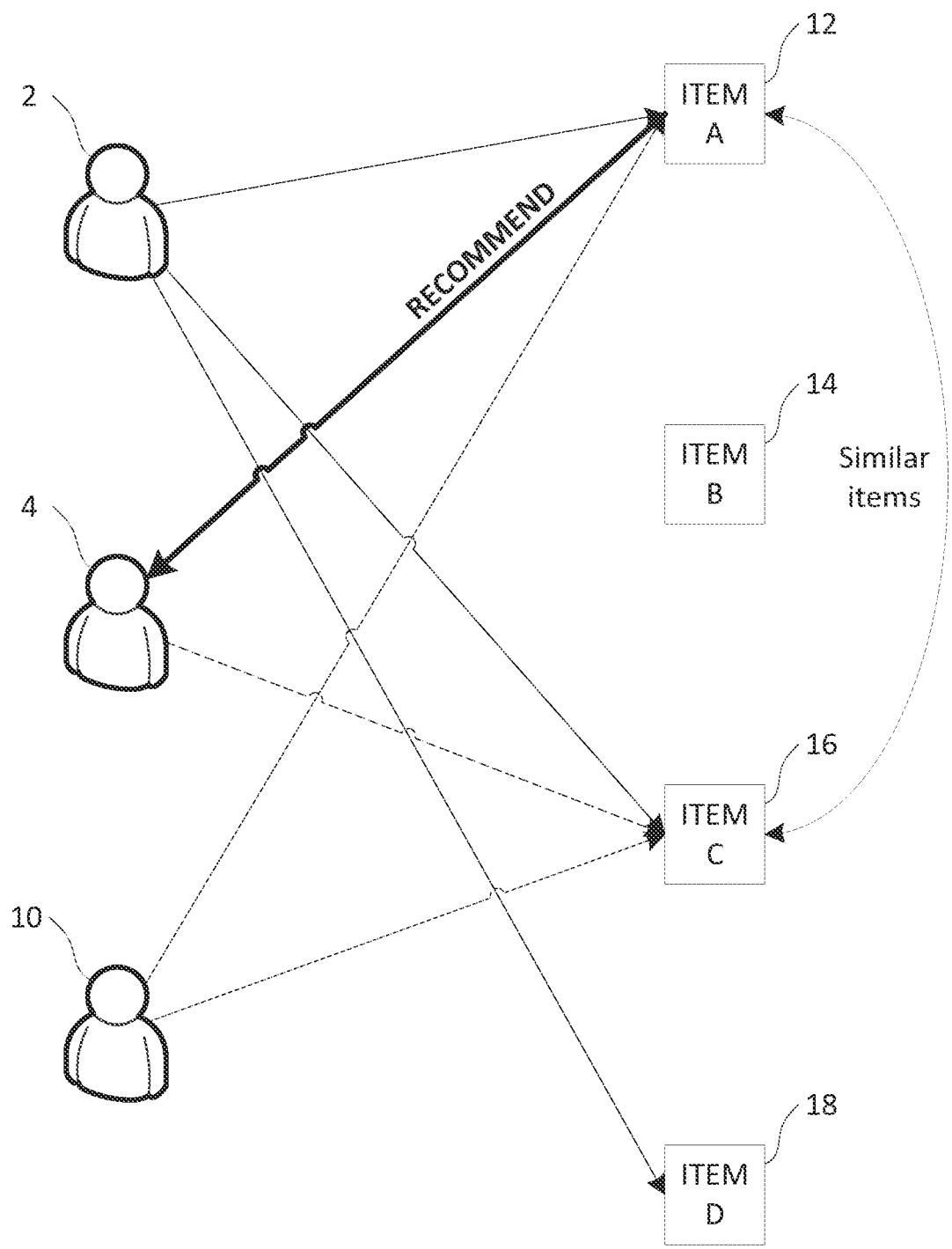

Referring to FIGS. 4a and 4b, the recommendation system may use a collaborative filtering approach. With this approach, observations stored by the recommendation system are used to predict the preferences of the first user 2. In particular, the past behaviour of the first user and the behaviour of the other users of the system is analysed to predict a reaction of the first user to a target item.

In particular, FIGS. 4a and 4b show a system comprising the first user 2, the second user 4, and a third user 10.

The system enables the user to select between four items: Item A 12, Item B 14, Item C 16, and Item D 18.

It will be appreciated that in practice, the system will typically comprise a larger number of users and a larger number of options.

In this example:

The first user 2 has indicated a preference for Item A 12, Item C 16, and Item D 18.

The second user 4 has indicated a preference for Item C 16.

The third user 10 has indicated a preference for Item A 12 and Item C 16.

FIG. 4a illustrates a user-based collaborative filtering approach, in which similar users are identified based on shared behaviours. In the example of FIG. 4a, it is determined that the first user 2 and the third user 10 have similar tastes since each of these users has indicated a preference for Item A 12 and Item C 16. Due to this shared taste, and due to the first user having indicated a preference for Item D 18, it is inferred that the third user is likely to enjoy Item D, and so Item D is recommended to the third user.

Referring to FIG. 4b, there is shown an item-based collaborative filtering approach, in which similar items are identified based on shared behaviours. In the example of FIG. 4b, it is determined that Item A 12 and Item C 16 are similar since these items have been enjoyed by both of the first user 2 and the third user 10. Since the second user 4 has enjoyed Item C, and since Item C is similar to Item A, it is inferred that the second user is likely to enjoy Item A, and so Item A is recommended to the second user.

In practice, a combination of these approaches may be used. Therefore, in general, the recommendation system is arranged to determine a correlation between a plurality of users and/or a plurality of items and to determine a suggestion for a user based on this correlation.

Similarly, collaborative filtering may use a memory-based approach and/or a model-based approach. With a memory-based approach, similar users are identified and then a recommendation for a second user is determined based on the historical behaviour of a first user. A memory-based approach is straightforward to implement, but can provide poor results where there is a sparsity of data. With a model-based approach, a model is used to predict a response of the first user to various items of content. This response may be based on a similarity of the first user to other users, the response of the first user to other items, etc. and the determination may use artificial intelligence and/or machine learning. A model based approach can predict responses even where there is a sparsity of data (e.g. when an item has just been added to the service), but can be difficult to configure accurately and can provide poor results if factors behind the responses of users are not properly accounted for. It will be appreciated that a combination of a memory-based approach and a model-based approach may be used, where this can mitigate the disadvantages of each approach.

With each approach (user-based or item-based and memory-based on model-based), it is important to determine a correlation (e.g. a similarity) between either users or items.

The determination of the correlation may be based on the Pearson correlation coefficient and/or a cosine similarity where a dataset is formed based on the behaviour of each user and/or item (e.g. based on likes, views etc.) and these dataset is used to identify similarities between users and/or items.

For a given user, the recommendation system is typically arranged to identify a number of 'neighbours', which neighbours are similar to the user. Therefore, where the system comprises n users, in order to provide recommendations to the first user 2, the system may identify the most similar k users (where k<n).

Once similar users have been identified, the response of the first user 2 to a previously unseen item can be predicted based on the responses of the neighbours of the first user to this item. In an exemplary implementation, a predicted response may be determined as:

$$\widehat{r_{u,i}} = \frac{\sum_{v=1}^{k} sim_{u,v} r_{v,i}}{\sum_{v=1}^{k} sim_{u,v}}$$

Where:

$\widehat{r_{u,i}}$ is a predicted response of user u to item i.

$r_{v,i}$ is a determined response of user v to item i (e.g. user v may have previously liked, or ranked, item i).

$sim_{u,v}$ is a similarity between users u and v (e.g. this may be a value between 0 and 1, where more similar users have a higher similarity value).

The recommendation system may then be arranged to output to the user i any items that exceed a threshold predicted response.

While the above examples have described a recommendation being based on a correlation between similar users, it will be appreciated that the recommendation may also (or alternatively) be based on an correlation between dissimilar users. For example, if the first user 2 and the second user 4 have very different tastes, then items that have been liked by the second user may not be recommended to the first user. Therefore, the predicted response of a user u to an item i may be determined as:

$$\widehat{r_{u,i}} = \frac{\sum_{v=1}^{k} sim_{u,v} r_{v,i}}{\sum_{v=1}^{k} sim_{u,v}} - \frac{\sum_{v=1}^{p} (1 - sim_{u,v}) r_{v,i}}{\sum_{v=1}^{p} (1 - sim_{u,v})}$$

Where there are k users determined to be similar to the user i (k 'neighbours'), there are p users determined to be dissimilar to the user i (p 'anti-neighbours'), and the similarity value is between 0 and 1.

Such a method that is based on correlations between users and on the past behaviour of similar users is fairly straightforward to implement and is not greatly affected by the addition of further users and items. However, where there are large numbers of users and items the computation of similarity and the computation of predicted responses can be computationally expensive and therefore slow.

Therefore, where such an approach is used, the set of neighbours for each user is typically pre-computed offline and/or found using approximate nearest neighbour methods. An exemplary nearest neighbour method can be implemented using the C++ library Approximate Nearest Neighbours Oh Yeah (Annoy); https://github(dot)com/spotify/annoy.

With the present disclosure, once the neighbours of the first user 2 have been determined, the user-based model is able to readily make recommendations for this first user without needing to re-determine the neighbours. In a simple example, when the user is offline it is determined that the closest neighbours of the first user are the second user 4 and the third user 10. Then when the first user logs onto the media system, recommendations can be determined by calculating predicted responses based on the previous responses of the second user and the third user. The neighbours for the first user may be regularly and/or periodically re-determined, e.g. once each 24 hours, each time the first user logs off the media system, and/or each time feedback is received from the first user.

Where an item-based approach is used, the neighbours of an item can be determined similarly, and then recommendations can be made to users based on a similarity between items (in this regard, most of the description below relates to determining a similarity between users and it will be appreciated that similar techniques are applicable for items).

Typically, in order to determine a similarity between users, the users are represented as vectors in a single vector space (e.g. an n-dimensional vector space). For example, each dimension may be associated with an item, where a user that has interacted with and/or liked an item is given a value of 1 for the dimension associated with that item and a user that has not interacted with and/or liked an item is given a value of 0 for the dimension associated with that item. Alternative scoring methods may also be used (e.g. a user that dislikes an item may be given a value of −1, a user that interacts with an item may be given a value of 1, and a user that likes an item may be given a value of 2).

Figure 5:
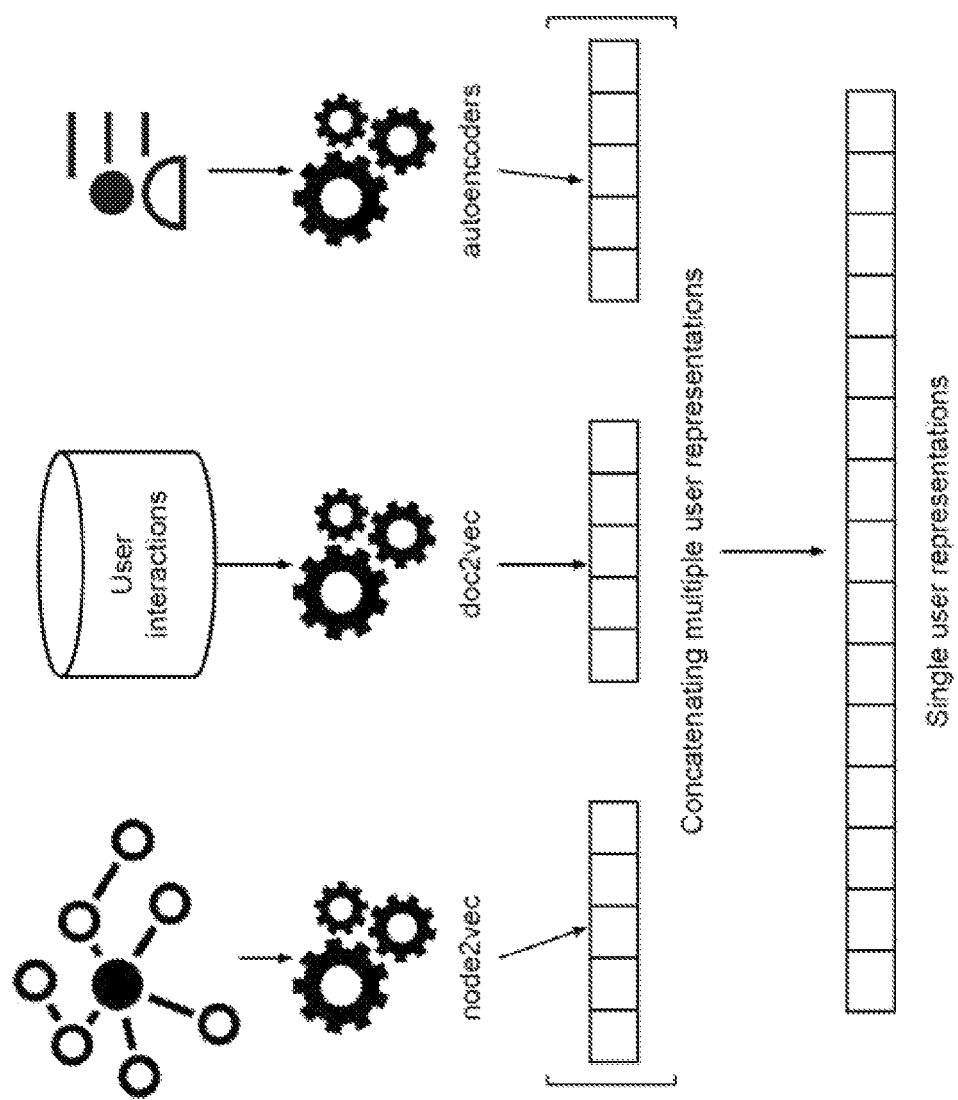
FIG. 5 shows an exemplary method of determining a user vector for a user.

As shown in FIG. 5, in order to determine a vector for a user each data source with data associated with that user (e.g. personal data, viewing history, etc.) may be converted into a separate vector representation. To get a vector representation of a user based on data from a social graph, tools such as node2vec can be used. To obtain a vector representation of a user based on their interaction with content, tools similar to doc2vec can be used. Autoencoders can be used to obtain a concise representation of a user by their properties.

The resultant vectors can then be combined into (e.g. concatenated into) a single vector that is used to represent the user.

More generally, the user vectors may comprise a combination of a plurality of component vectors, where these component vectors may be determined using a plurality of different processes, algorithms, and/or models.

The user vectors can be constructed using algorithmic frameworks such as node2vec, which is described in Grover and Leskovec; node2vec: Scalable Feature Learning for networks (2016); https://arxiv(dot)org/abs/1607(dot)00653.

In some embodiments, artificial intelligence and/or machine learning is used to determine the vectors and/or the groupings. In particular, machine learning can be used to determine the significance of various correlations. In this regard, it may be the case that Item A 12 is an acquired taste and so a shared interest in Item A may be a better indication of similarity than a shared interest in Item B 14. This sort of significant correlation may be determined stochastically. In some embodiments, significant correlations are determined using machine learning, where machine learning is particularly useful for determine surprising sets of significance (e.g. it may be the case that liking Item A and Item C 16, but not Item B is a particularly good indicator of similarity, and this may be difficult to determine conventionally).

The above method, that is based on determining a number of neighbours and determining the past experiences of these neighbours, can be sensitive to data sparsity and to the 'cold-start' problem. In this regard, where a user is new to a service it is difficult to identify the neighbours of this user. Similarly, where an item is new to the service, few users will have interacted with this item and so it is difficult to determine a similarity of this item to other items.

In order to prevent the cold-start problem, the recommendation system is typically arranged to determine whether the recommendation system has access to a threshold amount of information for a user. If the recommendation system does not have access to this threshold amount of information then a default vector may be used for the user.

This default vector may be based on an average user and/or an average new user. In some embodiments, the default vector for each user is the centroid vector of a cluster most closely associated with that user. In some embodiments, the default vector for each user is based on the vectors of users with a similar history. For example, a first user may have watched fifty films using a service, starting with Film A, Film B, and Film C. If a second user joins the service and then watches Film A, Film B, Film C, they may be assigned the same user vector as the first user until they have built up a sufficient profile to be assigned their own user vector.

In some embodiments, every user for which there is not sufficient information is assigned the same default vector. Typically, the information for each such user is combined to form the default user vector.

As has been described above, the vector for each user is typically formed from a combination of component vectors (e.g. there may be a first component vector that describes a user's social network and a second component vector that describes a user's interactions with content). In such a case, the vector for a user may be formed by using a default component vector for each component for which insufficient information is available. Typically, a user's social network and a user's profile can be determined before they have started interacting with content (e.g. as soon as a user makes an account). Therefore, a user that has just set up an account may have a user vector based on component vectors for the social network and user profile of the user as well as a default component vector for the user's interactions.

The methods described herein may comprise determining whether a 'new' user has recorded a sufficient amount of information to merit a non-default vector. In this regard, the new users of the system may be frequently evaluated to determine whether a threshold amount of information is available, where the reaching of this threshold results in a vector being determined for the user.

As described above, a similarity between users can be determined based on a similarity of vectors associated with these users. In order to ensure that the vectors for each user are up-to-date, it can be desirable to recalculate the vector for each user each time the underlying data relating to these users changes (e.g. each time a user watches a new film, updates a rating, etc.)—these changes in data can be termed 'events'.

However, recalculating the vectors frequently is extremely resource intensive. Therefore, in some embodiments the vectors are instead recalculated periodically and/or regularly, but not after every event (e.g. the vectors may be recalculated once every plurality of events). In particular, events relating to a user may be cached and the vector associated with this user may then be recalculated after a triggering event or after the passage of an amount of time.

As examples, the vector for a user may be calculated: once every day, after every ten events, and/or only after triggering events (and these 'triggering' events may be predetermined and/or may be based on the user—for example, a user watching a recommended film may be expected and so not seen as significant; however, a user watching an unexpected film such as a film in a previously un-viewed genre may be seen as significant and so may be a triggering event).

Furthermore, the vector for a user may be recalculated in the background (e.g. on the server 8 while the user is offline), so that following an event recommendations are provided based on a previously calculated vector until a new vector has been calculated.

Caching events and recalculating the vector only after a plurality of events has occurred reduces the number of vector calculations required per event. However, it does require there to be sufficient memory to store the events before the vector is recalculated. In practice, the event data is typically fairly small in size and so this memory requirement is not prohibitive.

Furthermore, when determining recommendations for the first user 2, the vector of the first user may be updated and then a similarity between the first user and the second user 4 may be determined based on a similarity between the updated vector of the first user an old vector of the second user.

Figure 6A:
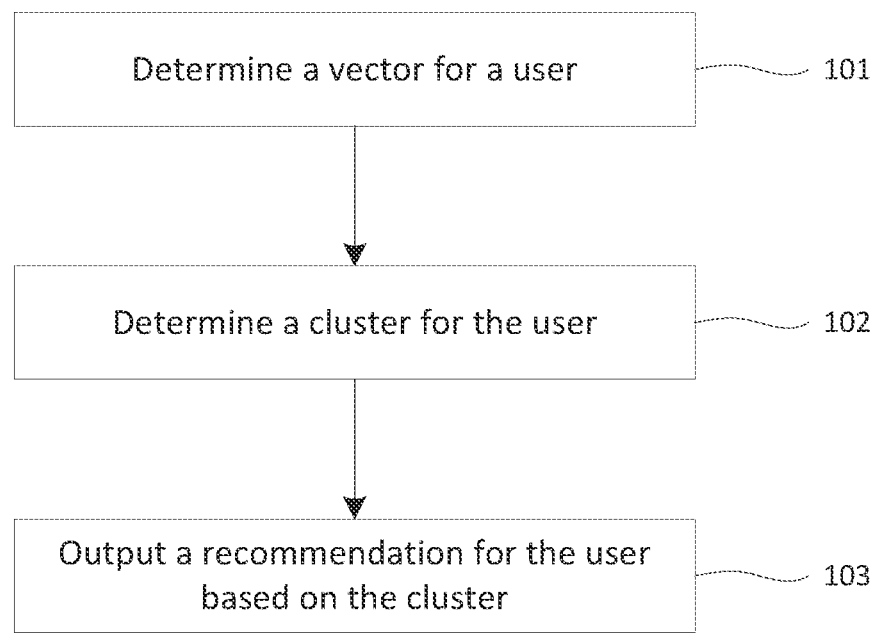
FIGS. 6a and 6b show methods of outputting recommendations for users in the system.

Referring to FIG. 6a, there is described an efficient method of determining a recommendation for the first user 2. This method is typically carried out by the recommendation system, which is implemented on one or more of the computer devices.

In a first step 101, the recommendation system determines a vector for the first user 2. A method of determining a vector has been described above.

In a second step 102, the recommendation system determines a cluster for the first user 2 based on the vector.

In this regard, the recommendation system is typically arranged to sort the users into clusters based on a similarity between the users (so that the number of clusters is several times less than the number of users). This clustering typically happens offline on the server 8, and is only performed periodically, so the speed of clustering is not a concern. The clustering may be based on stochastic algorithms that determine similarities between users. Equally, the clustering may be based on machine learning.

Figure 7:
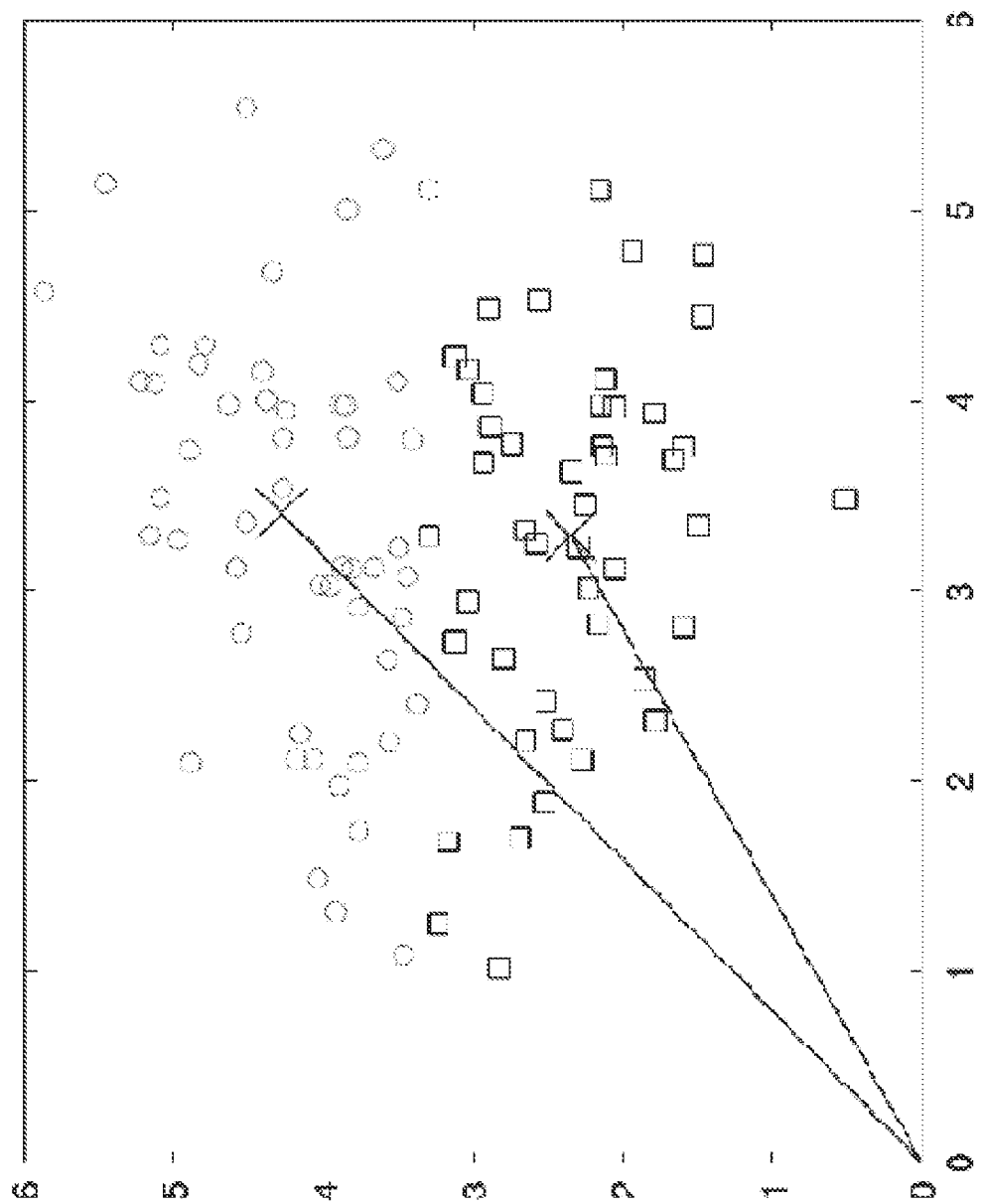
FIG. 7 shows a system comprising a plurality of users, which users are grouped into two clusters.

As shown in FIG. 7, each cluster can be described by a centroid vector that is a representation of each of the users in the cluster. Typically, the centroid vector for a cluster is determined as the average of each user vector located in this cluster. The centroid vector then gives a reasonable approximation of the users in this cluster. A suitable cluster can be determined for the first user 2 based on the centroid vector that is closest to the vector of the first user.

The aim of clustering is to find different groups of users within the same user base. Clustering algorithms find the structure in the data so that elements of the same user cluster are more similar to each other than to those from different clusters.

The clustering may be performed nightly, where users may then move between clusters during the day. The movement of users between clusters during the day does not affect the clusters. In this way a first cluster may be determined based partly on a first vector of the first user. A second vector of the first user may be determined at a later time and the first user may thereby move into a second cluster. The first cluster is not updated until the next clustering event that night.

An example of the clustering of users is shown in FIG. 7. This example shows two different clusters of users, where each cluster also has a cluster centroid vector that defines the centre of that cluster.

In a third step 103, the recommendation system outputs a recommendation for the first user 2 based on the determined cluster.

Recommendations can be provided based on the cluster in which a user is located. In particular, users may be shown recommendations in dependence on other users in the same cluster. In some embodiments, each user in the same cluster as the first user 2 is taken to be a neighbour of the first user. In some embodiments, a more detailed analysis (e.g. a comparison of each vector in the cluster to the vector of the first user) is performed for the users in the cluster to determine the neighbours of the first user.

Specifically, recommendations are typically provided by determining a predicted response of the user to a number of items based on the parameters of the user and based on the responses of the neighbours of the user to these items.

Typically, the clusters are determined in dependence only on users for which a threshold amount of data is available (e.g. users that have watched or rated a certain number of films). Users that do not achieve this threshold amount of data may still be placed into clusters, but typically the vectors of these users are not included in the determination of the clusters and/or in the determination of the centroid vectors.

The placement of a user into a cluster typically depends on the proximity of the vector associated with the user to a centroid vector associated with a cluster. Specifically, a user is typically sorted into the cluster with the closest centroid vector. This avoids the need to compare a user's vector to the vectors of all other users (which is beneficial since the system may contain a large number of users).

Typically, the recommendation system is integrated with a service, such as a media service. The user is then able to interact with the recommendation in order to view the media. For example, the user may click on a recommended link in order to start streaming a film. Therefore, the recommendation system and/or the computer device 1000 may be arranged to output content (or to take an action, such as sounding an alarm) in dependence on the recommendation.

Figure 6B:
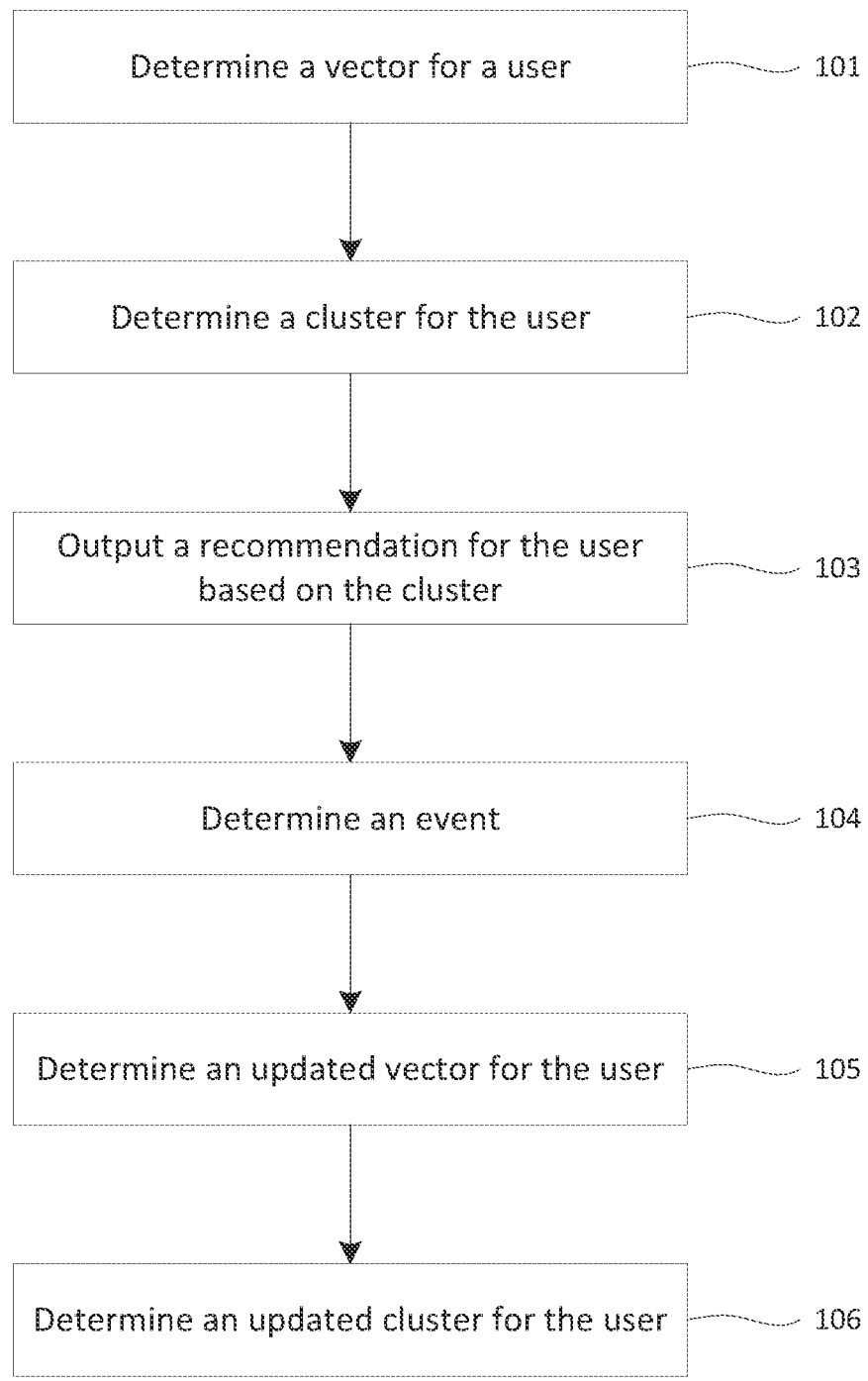

Referring to FIG. 6b, there is described a method of updating the cluster of the first user 2.

The first, second, and third step of the method of FIG. 6b are equivalent to the first, second, and third step of the method of FIG. 6a.

In a fourth step 104, the recommendation system detects an event associated with the first user 2. For example, the recommendation system may detect that the user has liked an item. In some embodiments, only certain events are classed as triggering events that trigger the update of a user's vector and the fourth step comprises the recommendation system determining a triggering event.

Triggering events are typically active events, e.g. a user rating an item, following another user, or writing a comment. Passive events, such as a user being followed, may be non-triggering.

In some embodiments, the triggering events for a user are dependent on that user. Triggering events may be selected by the user, or triggering events may be determined based on the previous behaviour of that user. For example, triggering events may be those events that are expected to cause a large change in the user's vector (e.g. unusual behaviour).

In a fifth step 105, the recommendation system determines an updated vector for the first user 2. The determination of the updated vector may comprise the determination of a new vector from scratch. Equally, the determination of the updated vector may comprise modifying the previous vector based on recent events.

In a sixth step 106, the recommendation system determines an updated cluster for the first user 2 based on the updated vector.

Recommendations can then be provided to the first user 2 based on this updated cluster. In particular, the recommendation system may determine the proximal centroid vector for the updated vector and assign the first user 2 to a cluster accordingly.

This method of updating the cluster of a user enables the recommendations for a user to be updated without the need to recalculate the vector of each other user of the system. On the contrary, in order to determine recommendations for a user, the vector of this user only needs to be compared to a relatively small number of centroid vectors.

The clusters and the centroid vectors are typically recalculated relatively infrequently, for example once each day or once each week. This recalculation may involve consideration of each user in the system and so may be rather time consuming.

The vectors for each user may be updated much more frequently (e.g. based on the frequency at which the user accesses the media service). The cluster into which a user is placed may also be updated much more frequently. Since the clusters themselves are only updated infrequently, it may be the case that a first cluster (and an associated first centroid vector) is determined at a first time based on a vector for the first user 2. Then at a second time, the vector for the first user may be updated and the first user may be placed in a second cluster. However, at this second time, the first centroid vector may stay the same. Therefore, even though the first user is no longer in the first cluster, the first centroid vector is unchanged and is still dependent on the old vector for the first user. Subsequently, at a third time the clusters are redetermined and the first centroid vector is updated to no longer be dependent on the vector for the first user.

This method of infrequent determination of clusters and centroid vectors, but relatively frequent updating of user vectors, enables recommendations to be updated regularly for users without excessive computation being needed. Theoretically, the clusters could become outdated since the centroid vectors for each cluster are redetermined only infrequently. However, in practice, each centroid vector is typically dependent on a large number of users and so the movement of a small number of users into or out of the cluster between re-clustering occurrences does not prevent the determination of accurate recommendations.

By altering the number of clusters and/or the size of clusters, recommendations of differing granularity may be provided. For example, smaller clusters may be used where precisely targeted recommendations are required.

In some embodiments, a hierarchical arrangement of clusters is provided, where a user is placed in a large, high echelon, cluster and also a lower echelon sub-cluster inside that large cluster (and potentially a sub-sub-cluster inside the sub-cluster, and so on). Each echelon of the hierarchy may be redetermined at a different frequency; in particular, the lower echelons may be redetermined more regularly than the higher echelons. In a simple practical example:

A system with 1000 users may be sorted into 10 clusters of 100 users each. These clusters may be redetermined on a weekly basis.

Each cluster of 100 users may itself be sorted into 10 sub-clusters of 10 users each. These sub-clusters may be redetermined on a daily basis.

The use of a hierarchy of clusters enables accurate recommendations to be provided without excessive (and time-consuming) recalculation. In practice, a user's overarching preferences are unlikely to change quickly—for example, users that listen mostly to rock music are unlikely to suddenly want to listen to house music. Therefore, it is sufficient to redetermine the clusters on an infrequent basis. However, the more specific preferences of each user, e.g. 80s rock vs 90s rock, may change on a more regular basis. By redetermining sub-clusters regularly, these small changes in specific preferences can be identified, while avoiding the expensive redetermining of high echelon clusters.

A reason for the clustering of users is to enable the recommendation system to identify other users who may be of interest to the first user 2.

This goal can also be achieved by searching for other users with similar interests to the first user, or by determining other users that are being followed by the first user.

This first type of solution tends to recommend very similar users. This can lead to a 'filter-bubble' problem in which the first user 2 is constantly recommended similar types of content and becomes unsatisfied with the lack of variety.

The second type of solution tends to lead to centralisation of follows. In particular, a small group of users can dominate the system (with this small group being followed by many users). As a result, the system can suffer from 'popularity bias', where this small group has a huge impact on the recommendations. This can lead to a feeling of "static" recommendations (since users constantly see the recommendations of the same small group of popular users).

Figure 8:
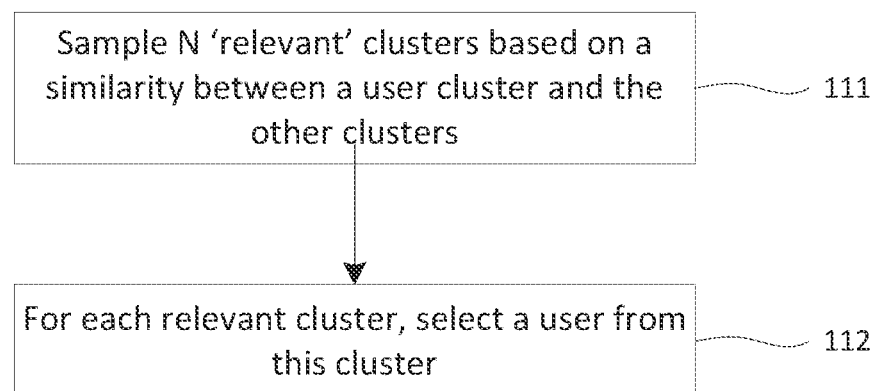
FIGS. 8 and 9 show steps that can be implemented to provide varied recommendations.

Referring to FIG. 8, there is described a method of outputting recommendations for the first user 2 that addresses these two problems.

In a first step 111, a plurality of relevant clusters are sampled based on a similarity between the vector and/or cluster of the first user 2 and other clusters. The plurality of user clusters are typically selected based on their similarity to the vector and/or cluster of the first user. As has been described above, the similarity of two clusters can be determined by a comparison of the centroid vectors of those clusters.

In a simple example, a vector of the first user 2—or the centroid vector associated with the cluster of the first user—is a distance d away from a first cluster centroid vector and a distance 2d away from a second cluster centroid vector. The probability of the first cluster being included in the sample may then be twice the probability of the second cluster being included in the sample. It will be appreciated that more complex sampling methods may be used—in general, the probability of a cluster being sampled is dependent on the distance of this cluster's centroid vector from the vector and/or cluster centroid vector of the first user.

In some embodiments, the cluster of the first user 2 can be sampled; in some embodiments, the cluster of the first user is precluded from being sampled. In some embodiments, a cluster can be sampled twice; in some embodiments, each cluster can only be sampled a single time. The number of clusters sampled in the first step may be determined by the first user 2 and/or by an administrator of a service.

The recommendation provided to the first user 2 is then dependent on these relevant clusters. This method of outputting a recommendation means that similar clusters (to the cluster of the first user) are sampled at a high rate so that the first user is normally shown recommendations that are likely to be of interest. However, there is also a small chance of a substantially different cluster being sampled, so that the user is also occasionally exposed to more unusual—and likely more hit and miss—content.

In as second step 112, for each relevant cluster a user is selected. The recommendations for the first user 2 are then determined based on these selected users. Similarly to the first step 111, this second step can be implemented to ensure that the first user is occasionally exposed to unusual content.

The selection of users within the clusters may be based on an activity and/or popularity of the users. In particular, this selection may be proportional to a user's activity and/or inversely proportional to a user's popularity—this avoids centralisation, where the more popular users continue to become more popular and so dominate the system. The selection of users may also be based on other factors, e.g. users to which the first user subscribes may be precluded from selection.

In some embodiments, this selection of users is based on components of the vectors of users. In particular, the selected users may be selected based on a similarity of the vectors of other users to the vector of the first user 2 as well as based on a large difference in one or more components of these vectors. In this way, the selected users can be chosen to have similar overall tastes to the first user while also having some tastes that differ substantially from the first user.

These steps provide a recommendation system that avoids both filter-bubble and popularity bias. These steps also ensure that even the newest users have a chance to be selected, which can increase their engagement in the very beginning of their interaction with a media service.

It will be appreciated that either of these steps may be carried out in isolation. For example, the first user 2 may be shown recommendations associated with another cluster in accordance with the first step 111, where the recommendations may be based on the centroid vector of that cluster as opposed to being based on a specific user in the cluster. Similarly, the first user may be shown recommendations based on specific users in the cluster of the first user in the described manner so that the first step is not always performed.

As described above, recommendations are typically determined and output based on a predicted response of the first user 2, where this predicted response is determined based on the previous responses of other, similar users (or clusters of users).

In some embodiments, the predicted response is determined based on the users that are followed by the first user 2. For example, the predicted response for a user u to an item i may be determined as:

$$\widehat{r_{u,i}} = \frac{\sum_{v \in F(u,i)} sim_{u,v} r_{v,i}}{\sum_{v \in F(u,i)} sim_{u,v}}$$

Where F(u,i) is the set of users that are followed by the user u and have also rated and/or interacted with, the item i.

This approach is based on the likelihood that the ratings of the users that user u follows (and that this user u likely trusts), will likely be more representative than a rating predicted on the basis of all users with similar interests.

To avoid a situation where few or none of these followed users have interacted with an item, the formula may include additive anti-aliasing, e.g. as described in C. D. Manning, P. Raghavan and H. Schütze, Introduction to Information Retrieval, New York: Cambridge University Press, 2008.

For example, additive smoothing may be added to the formula, so that the predicted response for a user u to an item i may be determined as:

$$\widehat{r_{u,i}} = \frac{\sum_{v \in F(u,i)} sim_{u,v} r_{v,i} + k * sim_u r_i}{\sum_{v \in F(u,i)} sim_{u,v} + k * sim_u r_i}$$

Where $sim_u$ is the average similarity of the user u with all other users, $r_i$ is the average rating of item i, and k is a smoothing parameter (k≥0).

Equally, this method of determining a predicted response may only be used when a threshold number of followed users have interacted with the item i.

Where the above methods have been described with reference to neighbours of the first user 2, these methods may equally be carried out based on users followed by the first user (and/or on followers of the first user).

Figure 9:
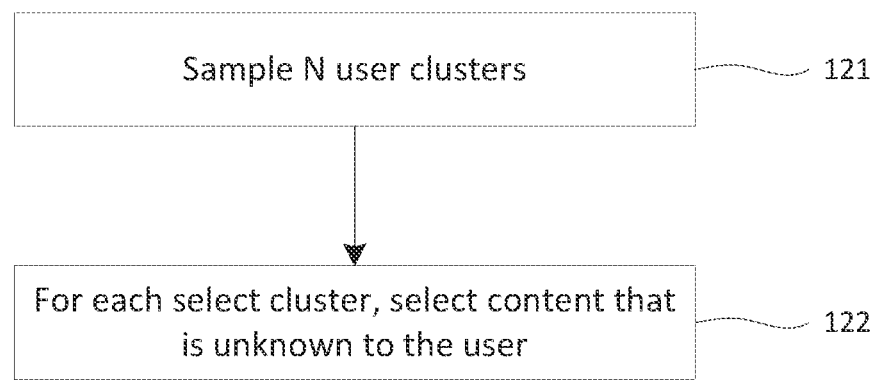

Referring to FIG. 9, in order to address the possibility of a data sparsity problem, where there is insufficient data available to make recommendations, an additional probabilistic fallback method may be implemented using the recommendation system. This fallback method is typically utilised where it is not possible to determine recommendations using the previously described methods.

In a first step 121, the recommendation system samples N user clusters based on a vector of the first user 2 (e.g. as has been described with reference to FIG. 6).

In a second step 122, for each selected cluster, the recommendation system selects content that is still unknown to the first user 2. The choice of content is based on the likelihood that the first user will take the targeted action on this content. For each selected item of content, a predicted value may be determined and these predicted values can be used to produce a ranked list of recommendations. By limiting this second step to only selected clusters, the computational cost of the second step can be kept at a practical level (where performing this second step over the entirety of the users and the items of the system would have an excessive computational cost).

This selection of content may be based on users in the selected cluster and/or may be based on content associated with the centroid vectors of the selected clusters. In this regard, vectors for users are determined based on the content with which that user has interacted. In a similar way, content associated with the centroid cluster can be determined using a reverse process.

The methods described herein have a number of benefits, including: speed; the ability to incorporate new users and content; and the ability to recommend relevant and diversified content. Diversification can be achieved, for example, by considering users and content from different clusters as described with reference to FIG. 8.

Alternatives and Modifications

Various other modifications will be apparent to those skilled in the art.

It will be understood that the present invention has been described above purely by way of example, and modifications of detail can be made within the scope of the invention.

Reference numerals appearing in the claims are by way of illustration only and shall have no limiting effect on the scope of the claims.

What is claimed is:

1. An apparatus for providing a recommendation to a first user,
wherein the apparatus comprises:
a processor arranged to:
determine, at a first time, a first set of vectors for a plurality of users, including a vector associated with the first user;
determine a set of clusters based on the first set of vectors;
detect, at a second time, an event associated with the first user;
determine an updated vector for the first user in dependence on the event;
place the first user into a cluster of the set of clusters based on the updated vector; and
determine a recommended item of content for the first user in dependence on the cluster and in dependence on a predicted response to the item of the first user;
wherein the processor is arranged to determine one or more further users that are followed by the first user and to determine the predicted response to the item of the first user in dependence on the responses to the item of said one of more further users; and
a user interface and/or communication interface arranged to:
output the recommendation and/or the recommended item to the first user.

2. The apparatus of claim 1, wherein the processor is arranged to determine a cluster centroid vector for each of the clusters.

3. The apparatus of claim 2, wherein placing the first user into a cluster comprises determining a closest cluster centroid vector to the updated vector.

4. The apparatus of claim 1, wherein determining the recommended item comprises determining that a predicted response of the user to the item exceeds a threshold response.

5. The apparatus of claim 4, wherein the predicted response is determined based on:
the response of one or more other users to the item; and
a similarity between the first user and each of the other users.

6. The apparatus of claim 1, wherein the processor is arranged to determine one or more neighbours of the first user based on a similarity between the vectors of the first user and the vectors of the neighbours, wherein the recommended item depends on said neighbours.

7. The apparatus of claim 6, wherein determining one or more neighbours comprises determining one or more users in the same cluster as the first user.

8. The apparatus of claim 6, wherein determining one or more neighbours comprises determining one or more users in a different cluster to the first user.

9. The apparatus of claim 1, wherein the processor is arranged to determine whether the event is a triggering event and to determine the updated vector in dependence on the event being a triggering event.

10. The apparatus of claim 1, wherein:
the processor is arranged to determine periodically an updated vector for the first user; and/or
the processor is arranged to determine periodically:
a set of vectors for a plurality of users; and
a set of clusters based on the first set of vectors.

11. The apparatus of claim 10, wherein:
the determining of the updated vector occurs more frequently than the determining of the set of clusters; and/or
the determining of the updated vector occurs based on an event; and/or
the determining of the set of clusters occurs regularly and/or at a fixed period.

12. The apparatus of claim 1, wherein the processor is arranged to determine a plurality of users for which a threshold amount of data is available, wherein the clusters are determined based only on said plurality of users.

13. The apparatus of claim 12, wherein the processor is arranged to assign a default vector to users for which the threshold amount of data is not available.

14. The apparatus of claim 1, wherein each vector is formed of a combination of component vectors, wherein the component vectors are determined using different processes and/or algorithms.

15. The apparatus of claim 14, wherein the processor is arranged to assign default component vectors to users for which a threshold amount of data associated with the corresponding component is not available.

16. The apparatus of claim 1, wherein the processor is arranged to sample a plurality of relevant clusters based on a similarity between a further cluster and the plurality of sampled clusters, wherein the recommended item is determined in dependence on the plurality of relevant clusters.

17. The apparatus of claim 16, wherein the processor is arranged to select one or more sampled users from each of the sampled clusters, wherein the recommended item is determined in dependence on the sampled users.

18. The apparatus of claim 1, wherein a selection of sampled users is based on a difference between one or more of the components of the vectors of the selection of sampled users and one or more corresponding components of the vectors of the first user.

19. A system for providing a recommendation to a first user,
wherein the system comprises:
a processor for:
determining, at a first time, a first set of vectors for a plurality of users, including a vector associated with the first user;
determining a set of clusters based on the first set of vectors;
detecting, at a second time, an event associated with the first user;
determining an updated vector for the first user in dependence on the event;
placing the first user into a cluster of the set of clusters based on the updated vector; and
determining a recommended item of content for the first user in dependence on the cluster and in dependence on a predicted response to the item of the first user;
wherein the processor is arranged to determine one or more further users that are followed by the first user and to determine the predicted response to the item of the first user in dependence on the responses to the item of said one of more further users; and
a user interface and/or a communication interface for outputting the recommendation and/or the recommended item to the first user.

20. A method of providing a recommendation to a first user, the method comprising:
- determining, at a first time, a first set of vectors for a plurality of users, including a vector associated with the first user;
- determining a set of clusters based on the first set of vectors;
- detecting, at a second time, an event associated with the first user;
- determining an updated vector for the first user in dependence on the event;
- placing the first user into a cluster of the set of clusters based on the updated vector;
- determining a recommended item of content for the first user in dependence on the cluster and in dependence on a predicted response to the item of the first user;
- wherein determining the predicted response to the item of the first user comprises: determining one or more further users that are followed by the first user; and determining the predicted response to the item of the first user in dependence on the responses to the item of said one of more further users; and
- outputting the recommendation and/or the recommended item to the first user.

* * * * *